United States Patent [19]

Dickinson

[11] 4,200,448

[45] Apr. 29, 1980

[54] GLASS MANUFACTURE

[75] Inventor: George A. Dickinson, St. Helens, England

[73] Assignee: Pilkington Brothers Limited, St. Helens, England

[21] Appl. No.: 907,776

[22] Filed: May 19, 1978

[30] Foreign Application Priority Data

Jun. 3, 1977 [GB] United Kingdom ............... 23699/77

[51] Int. Cl.² ............................................. C03B 5/22
[52] U.S. Cl. ....................................... 65/134; 65/137
[58] Field of Search .................. 65/178, 137, 134, 204

[56] References Cited

U.S. PATENT DOCUMENTS

| | | | |
|---|---|---|---|
| 3,350,187 | 10/1967 | Brichard et al. | 65/134 |
| 3,836,349 | 9/1974 | Knavish | 65/137 X |
| 3,909,227 | 9/1975 | Dickinson | 65/137 X |
| 3,989,496 | 11/1976 | Dickinson et al. | 65/178 X |
| 4,046,546 | 9/1977 | Hynd | 65/178 X |
| 4,047,918 | 9/1977 | Heithoff | 65/178 X |
| 4,052,186 | 10/1977 | Rhodes | 65/137 |

Primary Examiner—Richard V. Fisher
Assistant Examiner—Frank W. Miga
Attorney, Agent, or Firm—Burns, Doane, Swecker & Mathis

[57] ABSTRACT

In a glass melting tank, a plurality of stirrers are spaced apart across the tank and arranged to extract heat from the forward flowing glass so as to achieve a differential extraction of heat from the glass which flows along a return path towards the inlet end after stirring, and that glass which continues along a forward path to the outlet end of the tank.

4 Claims, 12 Drawing Figures

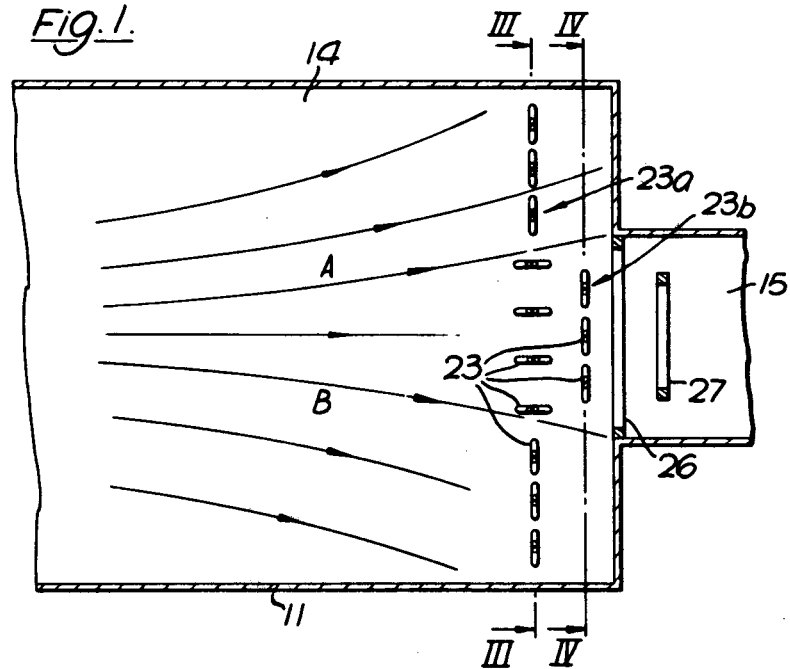
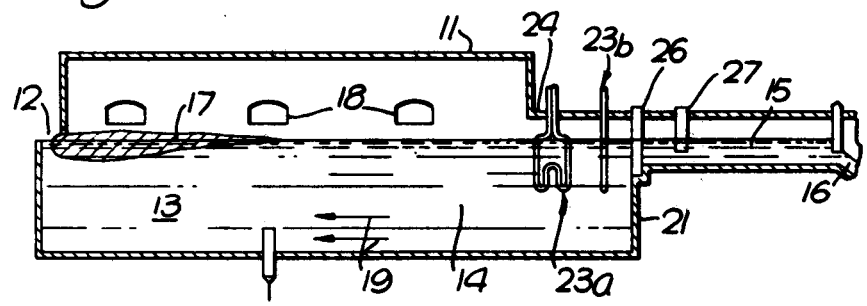

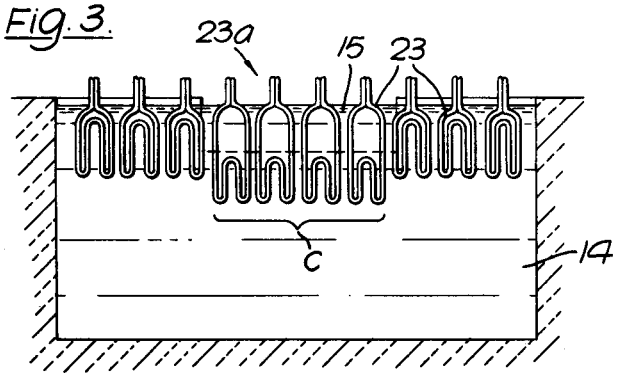
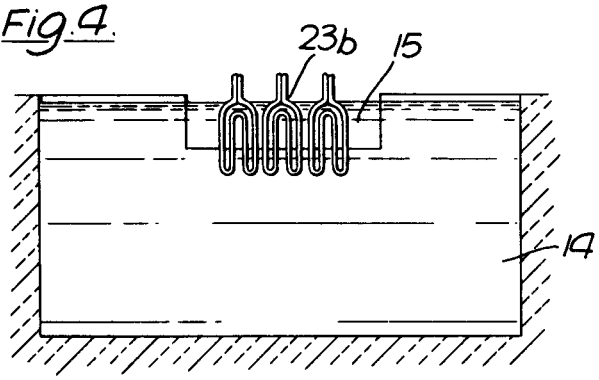
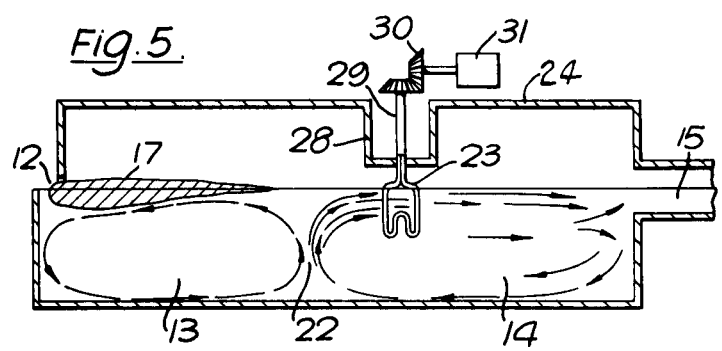

GLASS MANUFACTURE

BACKGROUND OF THE INVENTION

The invention relates to a method of producing molten glass and to a glass melting tank for carrying out the method.

In the manufacture of glass in tank furances, unmelted batch material is fed onto an established bath of molten glass at one end of the tank where it is melted. The molten glass which forms from the batch material passes from the inlet end of the tank sequentially through a melting zone, a refining zone and a conditioning zone before being drawn off from an outlet end of the tank for use in a glass forming process in known manner.

Conventionally heat is supplied for melting and refining the glass by the combustion of liquid or gaseous fuel above the glass surface, or by electric heating within the body of the glass or by a combination of both methods.

A rising temperature gradient is normally arranged in the molten glass along the melting zone of the tank, by control of the energy input along the tank length, the temperature reaching a maximum at a so-called hot spot. Downstream of this position the energy input is controlled to cause a falling temperature gradient in the molten glass. The effect of these gradients is to give rise to convection currents which return hot glass in the upper layers underneath a blanket of unmelted batch material from the hot spot towards the filling end. At the same time glass in the upper layers downstream of the hot spot is carried forwards towards the conditioning zone and colder glass in the lower layers flows back towards the hot spot. These convective flows serve to homogenise the glass and the colder lower layers of glass in the refining zone prevent furnace bottom refractories reaching a temperature sufficiently high for rapid chemical attack and erosion.

It is difficult in practice to obtain completely homogeneous glass in a glass melting tank particularly when the output from the tank is high in relation to its size since high energy inputs are necessary to melt and refine the glass whilst high temperature gradients are required to maintain the convective circulation at high enough levels. As the output of the tank is increased, more heat passes through the tank with the glass to the conditioning zone where it has to be removed to bring the glass to a satisfactory thermal condition for processing.

The glass in the conditioning zone is generally cooled by air blown across the free surface of the glass but if this surface cooling is sufficiently large, hotter glass from within the body of the glass rises disrupting the smooth flow of layers of glass, which varies slightly in composition, and results in these layers deviating from a state generally parallel to the major surface of the glass in the final product. This gives rise to optical faults and the disruption of flow is termed "inversion".

It is known that in a conventional tank furnace with one exit on the central line of the tank only a relatively small proportion of the glass being melted, refined and conditioned travels directly to the outlet end of the forming process. This comes from within a narrow region in the conditioning zone about the central line of the furnace and the remainder moves under convective flow towards the walls of the tank where it sinks and returns towards the inlet end forming a return flow as discussed above.

It is an object of the present invention to provide an improved method and apparatus for manufacturing molten glass in which the forward flowing glass which is advancing towards the conditioning zone is stirred and selectively cooled so as to achieve improved results.

SUMMARY OF THE INVENTION

The present invention provides a method of producing molten glass comprising feeding glass forming materials into an inlet end of a glass melting tank, melting the material in a melting zone of the tank adjacent the inlet end of the tank, refining the molten material at a position downstream of the melting zone and conditioning the molten glass adjacent an outlet end of the tank so that the molten glass is ready for use in a forming process, said method further comprising applying heat to the contents of the tank so as to cause forward and return flows of molten glass, stirring the molten glass which is flowing in a substantially forward direction by a plurality of stirrers spaced laterally apart across the tank, extracting heat from the forward flowing glass through said stirrers, and regulating the amount of heat extracted by the stirrers so as to achieve a differential extraction of heat from the glass which flows along a return path towards the inlet end after stirring, and that glass which continues along a forward path to the outlet end of the tank.

In normal operation it is desirable to regulate the heat extraction by the stirrers so that less heat is extracted from the glass which flows along a return path towards the inlet end after stirring than that which is extracted from the glass which continues along a forward path to the outlet end of the tank.

Preferably stirring is effected on the glass passing from the refining zone to the conditioning zone. In this way, the stirring is effected at a position downstream of the hot spot. The stirring may be effected in the refining zone and/or immediately adjacent the inlet of the conditioning zone.

Preferably the differential heat extraction is such that there is a variation in heat extraction across the width of the tank. Commonly the outlet of the tank is arranged in line with a central axis along the length of the tank and in such a case, it is preferable that the differential heat extraction is arranged to extract more heat from the central region of the forward flowing glass than from the glass adjacent the edges of the tank.

It has been found that by stirring the glass and cooling with a differential heat extraction so that the minimum of cooling occurs on that glass which subsequently returns in a return flow towards the melting zone, it is possible to improve the homogeneity of the glass, not only because the glass passing the stirrers is attenuated causing thinning of the layers of glass of differing composition and thereby increasing the diffusion between layers, but also by reducing the temperature within the body of the molten glass and reducing the need for the high surface cooling which can give rise to inversion flow in the conditioning zone. That glass which returns towards the melting zone does so in a more homogeneous form and is made even more homogeneous on its eventual return to the conditioning zone. Furthermore the stirrers in this particular instance do not cool the glass to the same extent as those placed in the glass flowing directly to the forming process and consequently more heat is preserved in those areas where it is mostly required, namely upstream of the conditioning zone.

The invention also provides a glass melting tank comprising a tank body having an inlet end at which glass forming material may be fed into the tank, a melting zone adjacent the inlet end of the tank body, an outlet end from which molten glass may pass to a forming process, a conditioning zone for thermally conditioning the molten glass adjacent the outlet end, a refining zone for refining the molten glass between the melting and conditioning zone, heating means arranged to apply heat to melt the glass within the tank and maintain forward and return flows of molten glass within the melting and refining zones, and stirring means located in the forward flowing glass adjacent the outlet end of the refining zone, said stirring means comprising a plurality of stirrers arranged to extract heat from the molten glass, the arrangement of stirrers being such that less heat is extracted from the glass which flows along a return path towards the inlet end after stirring than that which is extracted from the glass which continues along a forward path to the outlet end of the tank.

Preferably the stirrers are spaced laterally across the tank with a greater density of stirrers located in a flow path which is directly aligned with the outlet of the tank.

Commonly the outlet from the tank is centrally located with respect to the tank body and in such a case, a greater density of stirrers may be located in the central region of the forward flow path of molten glass.

As an alternative to, or in addition to, varying the density of stirrers across the width of the forward flow path, the stirrers may be arranged to provide different amounts of heat extraction. For example, the stirrers may be varied across the flow path so as to alter the depth of penetration into the molten glass by each stirrer. Furthermore, the stirrers may have different cooling means arranged to achieve different amounts of heat extraction. Furthermore, the stirrers may be varied to have different overall dimensions or shapes in order to vary the extent of heat extraction.

In some cases the conditioning zone may be arranged to contain molten glass to the same depth as the refining zone. In other cases, the conditioning zone may have a base raised relative to that of the refining zone so that a relatively shallow layer of molten glass passes through the conditioning zone, all the glass in the conditioning zone being arranged to flow towards the outlet end with substantially no return flow. In such a case where a shallow conditioning zone is used, a plurality of stirrers may be arranged to extend across the tank adjacent the outlet end of the refining zone, the stirrers being arranged to provide a varied heat extraction in depth of molten glass so as to achieve greater heat extraction of that glass flowing directly to the conditioning zone.

The invention is applicable to a glass melting tank of the type described in our U.S. Pat. No. 4,046,546. It is also applicable to a glass melting tank of the type described in our U.S. Pat. No. 4,052,186.

BRIEF DESCRIPTION OF THE DRAWINGS

FIG. 1 is a plan view of part of a glass melting tank incorporating the present invention, FIG. 2 is a vertical section along a central axis of the tank shown in FIG. 1, FIG. 3 is a vertical section along the line 3—3 in FIG. 1, FIG. 4 is a similar vertical section along the line 4—4 in FIG. 1, FIG. 5 is a vertical section along the length of an alternative form of glass melting tank in accordance with the invention.

DESCRIPTION OF THE PREFERRED EMBODIMENTS

Figure 6:
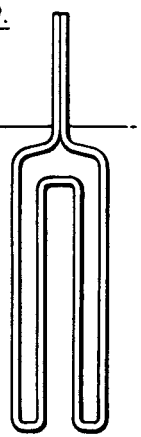
FIGS. 6 to 12 show different forms of stirrer which may be used in the glass melting tank.
Figure 7:
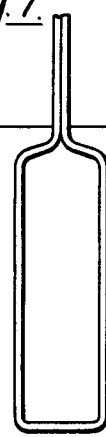

The tank shown in FIGS. 1 and 2 is generally similar to that described in our U.S. Pat. No. 4,052,186. A glass melting tank 11 has a filling pocket at one end 12 into which is fed raw material for glass manufacture. The raw material floats on the previously melted glass in the form of a blanket 17. The blanket melts progressively in a melting zone 30 adjacent the filling end of the tank. The molten glass passes progressively in a downstream direction through a refining zone 14 to a conditioning zone 15 adjacent the working end of the tank. An outlet 16 is provided at the working end from which the glass is removed for use in a subsequent forming process. Gas or oil heating devices are located along the sides of the body of the tank downstream of the filling end 12 for heating the molten glass via heating ports 18. Waste gases pass through regenerator ports leading to a furnace chimney.

In a refining zone 14 the molten glass circulates with the glass in the upper layers flowing in a downstream direction while the glass nearer the bottom of the tank forms a return flow marked by the arrows 19 leading back towards the filling end of the tank. In the refining zone undissolved gases are released to the atmosphere. In the conditioning zone 15 the glass is thermally conditioned so as to achieve the desired thermal condition and composition homogeneity ready for the subsequent glass forming process.

In each of the zones of the tank, it is possible to achieve some circulation of the glass with a return of flow towards the filling end 12 of the tank. The amount of return flow if any is dependent on the depth of the molten glass in the zone, the output of the tank, and also the temperature gradient between the beginning and end of the zone. In the example shown, the melting zone 13 and the refining zone 14 are the deepest zones in the tank and the base of the tank has an upward step 21 at the junction of the refining and conditioning zones so that the conditioning zone 15 is substantially shallower than the melting and refining zones. The conditions in the refining zone are such that a degree of return of flow 19 occurs. Substantially all the glass flow in the conditioning zone 15 is away from the filling end 12 of the tank, the depth of the glass being selected to achieve this condition. The recirculating flows have been shown more clearly in the alternative embodiment shown in FIG. 5 in which similar reference numerals have been used for similar parts. As can be seen, the return flow 19 in the refining zone rises adjacent the hot spot 22 between the melting and refining zones. The molten glass which rises at the hot spot 22 divides so that some returns back towards the filling end 12 immediately below the blanket 17. Other glass forms the forward flowing upper layers passing through the refining zone 14. Although the recirculating flows and hot spot have not been shown fully in FIG. 2, they are similar to those indicated in FIG. 5.

Although the return or recirculating flows in the melting and refining zones of the tank improve homogeneity, glass quality is not necessarily sufficiently improved particularly at high outputs from the tank. To improve this, stirrers 23 are introduced through the roof 24 of the furnace immediately upstream of the inlet to the conditioning zone. In this particular case, the stirrers are arranged in two rows. One row 23a extends fully across the width of the tank and a second row 23b downstream of the row 23a extends only across the central region of the tank immediately in front of the entrance to the conditioning zone 15.

The glass entering the conditioning zone is cooled by cooling pipes 26 and 27 as well as by surface cooling, as has already been described in our U.S. Pat. No. 4,052,186.

In this particular example, the stirrers 23 are arranged to achieve differential heat extraction from the molten glass so that more heat is extracted from that glass which after stirring flows directly to the conditioning zone 15, than from the glass which after stirring forms part of the return flow 19 back towards the inlet end of the tank.

Figure 8:
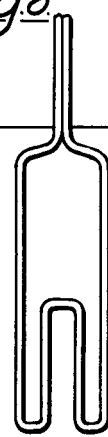
Figure 9:
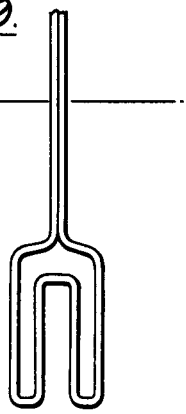
Figure 10:
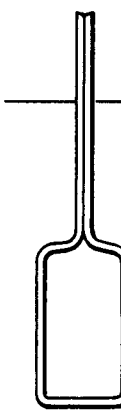

The row of stirrers 23a is shown more clearly in FIG. 3 although in this Figure the central four stirrers have been turned through 90° in order to show their configuration more clearly. As can be seen from FIG. 1, the central four stirrers are normally arranged to be 90° out of phase with the three stirrers on each side of them. The downstream central bank of stirrers 23b is shown more clearly in FIG. 4. As can be seen from FIG. 4, the downstream stirrers 23b each comprise a stirrer of the type shown in FIG. 6. The upstream stirrers 23a differ across the width of the tank. The three outermost stirrers on each side of the tank are also similar to those shown in FIG. 6 and have the same dimensions as the downstream stirrers 23b. The four central stirrers in the upstream bank 23a are each similar to those shown in FIG. 8 and are arranged to provide deeper penetration into the molten glass. Each of the stirrers 23a and 23b comprises a tubular steel stirrer formed with a hollow pipe through which cooling water is passed.

As can be seen from FIGS. 3 and 4, the two banks of stirrers provide an increased density of stirrers in the central region of the tank and the downstream bank 23b is arranged to provide substantial cooling at a depth just below the surface of the glass which is directly in line with the relatively shallow conditioning zone 15.

As is marked in FIG. 1, most of the glass flowing along the narrow central region of the tank between the flow lines A and B passes the central four stirrers of the upstream bank 23a as well as the downstream bank 23b and passes directly into the conditioning zone 15. Most of the glass outside the central region between the flow lines A and B falls towards the bottom of the refining zone and forms part of the return of flow 19.

The tank shown in FIG. 5 is in many ways similar to that shown in FIGS. 1 and 2 although the cooling pipes 26 and 27 are not provided adjacent the inlet to the conditioning zone. In this particular arrangement, the roof 24 of the tank is provided with a dropped channel portion 28 terminating just above the level of molten glass in the tank and the transverse row of stirrers 23 are arranged so that the shafts 29 pass through the base of the channel portion 28. Each of the shafts is coupled at its upper end through bevelled gearing 30 to a drive motor 31.

The invention is not restricted to the details of the foregoing examples. For instance, various arrangements of stirrers may be used although in all cases the arrangement is such as to achieve a differential heat extraction between that glass which after stirring flows directly to the outlet end and that glass which after stirring flows back towards the inlet end of the tank.

The amount of heat extracted differentially from the flows going directly to the forming process and those returning towards the melting end is dependent upon tank design, the manner in which the tank is operated and the output of the tank. The amount of heat necessary to be extracted at each position or area of stirring would be evident to those skilled in the art from the quality of glass being produced in any particular output. For instance, at an output of about 2000 tons/week, the heat extracted is such that preferably the temperature of the glass flowing forward directly to the forming process is controlled within the range 1240° C. to 1400° C. measured by thermocouples immersed in the glass 7 inches from the bottom refractories at positions approximately 2 feet upstream of the stirrers, the return flow temperature within the range 1140° C. to 1350° C. measured by thermocouples immersed 34 inches below the surface of the glass and approximately 2 feet upstream of the stirrers. This is in the case where the stirrers are located as shown in FIG. 1 immediately adjacent the outlet end of the refining zone.

The differential cooling across the width of the tank may be achieved by increasing the number of stirrers in areas where greater amounts of heat need to be extracted or by increasing or decreasing the depth of stirrer penetration in the upper layers of forward flowing glass. This is subject to the limitation that the operation of the blades too close to the free surface of the glass may result in bubble and too great a penetration may cause the return flows to be unduly restricted. As can be seen from the examples in FIGS. 6 to 12, the stirrers are always operated with the paddle part of the stirrers being located wholly below the free surface of the molten glass.

The differential heat extraction may alternatively be achieved by operating with stirrers having different cooling means. For example, the stirrers already described comprise fluid cooled tubular steel stirrers. Alternatively refractory metal clad refractory stirrers having air-cooled cores may be used as these will extract less heat than the water-cooled tubular stirrers.

A combination of these means of obtaining differential heat extraction may be adopted. It has been found that the use of fluid cooled stirrers and varying the depth of immersion to adjust the heat extraction for small changes in tank operating conditions is preferable and for greater changes in furnace conditions e.g. substantial increases or decreases in output where both glass flows and temperature conditions change appreciably it may be necessary to replace certain stirrers by others having different overall and detailed dimensions. In areas where minimum heat is required to be extracted refractory metal clad refractory stirrers having an air-cooled core may be used.

Figure 11:
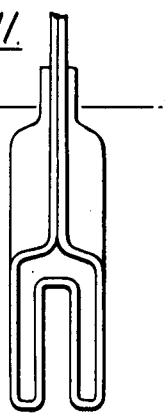
Figure 12:
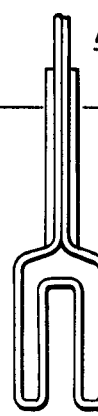

The examples shown in FIGS. 6 to 12 indicate different forms of stirrer which give different degrees of penetration and different amounts of cooling at different depths in the molten glass although in all cases the upper shoulder of the paddle on the stirrer must not break the glass surface otherwise atmosphere would be folded in with the glass resulting in bubble. FIGS. 6 to 12 show different configurations of hollow tubular stirrer through which cooling water is passed, the configuration in each case giving a different extent of cooling and a different location in depth of the main cooling surfaces. In FIGS. 11 and 12 the main cooling pipes are located towards the bottom end of the stirrer while the upper part of the stirrer has a blade arranged to achieve substantial stirring effect without substantial cooling.

I claim:

1. A method of producing molten glass comprising feeding glass forming materials into an inlet end of a glass melting tank having confining wall surfaces, a bottom and an outlet end, melting the material in a melting zone of the tank adjacent the inlet end of the tank, refining the molten material at a position downstream of the melting zone, stirring the molten material flowing towards the outlet end of the tank by a plurality of stirrers that are spaced laterally apart across the tank and which are capable of extracting heat from the molten glass, and conditioning the molten glass adjacent the outlet end of the tank so that the molten glass is ready for use in a forming process, said method further comprising providing temperature gradients in the contents of the tank so as to cause the forward flow of molten glass towards said outlet end of the tank and a return flow of molten glass toward said inlet end of the tank, said return flow further being initiated by flow towards the wall surfaces and flow towards the bottom of the melting tank, wherein the amount of heat extracted by the stirrers from the glass flowing therethrough is such that less heat is extracted from the molten glass which constitutes the return flow of molten glass than is extracted from the molten glass which continues forward to said outlet end.

2. A method according to claim 1 wherein stirring is effected on the glass passing from the refining zone to the conditioning zone.

3. A method according to claim 1 wherein the heat extraction is regulated such that there is a variation in heat extraction across the width of the tank.

4. A method according to claim 3 wherein the heat extraction is regulated to extract more heat from the central region of the forward flowing glass than from the glass adjacent the edges of the tank.

* * * * *